US008849536B2

United States Patent
Böhm et al.

(10) Patent No.: US 8,849,536 B2
(45) Date of Patent: Sep. 30, 2014

(54) METHOD AND DEVICE FOR CONTROLLING AN ELECTROHYDRAULIC BRAKE SYSTEM

(75) Inventors: Jürgen Böhm, Oberneisen (DE); Tom Kaufmann, Ippenschied (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 13/981,197

(22) PCT Filed: Jan. 20, 2012

(86) PCT No.: PCT/EP2012/050824
§ 371 (c)(1),
(2), (4) Date: Jul. 23, 2013

(87) PCT Pub. No.: WO2012/101040
PCT Pub. Date: Aug. 2, 2012

(65) Prior Publication Data
US 2013/0304345 A1    Nov. 14, 2013

(30) Foreign Application Priority Data

Jan. 27, 2011 (DE) .......................... 10 2011 003 230
Jan. 19, 2012 (DE) .......................... 10 2012 200 705

(51) Int. Cl.
| | |
|---|---|
| B60T 13/66 | (2006.01) |
| B60T 13/16 | (2006.01) |
| B60T 13/68 | (2006.01) |
| B60T 8/32 | (2006.01) |

(52) U.S. Cl.
CPC ............ B60T 13/662 (2013.01); B60T 13/162 (2013.01); B60T 8/326 (2013.01); B60T 13/686 (2013.01)

USPC ............................................. 701/70; 188/137

(58) Field of Classification Search
None
See application file for complete search history.

(56) References Cited

U.S. PATENT DOCUMENTS

| | | | | |
|---|---|---|---|---|
| 5,887,954 | A * | 3/1999 | Steiner et al. | 303/113.4 |
| 7,188,913 | B2 * | 3/2007 | Yokoyama et al. | 303/113.4 |
| 2003/0038541 | A1* | 2/2003 | Suzuki et al. | 303/155 |
| 2005/0082999 | A1* | 4/2005 | Ether | 318/362 |
| 2010/0026083 | A1* | 2/2010 | Leiber et al. | 303/3 |

FOREIGN PATENT DOCUMENTS

| | | |
|---|---|---|
| DE | 43 35 769 C1 | 12/1994 |
| DE | 195 43 583 C1 | 2/1997 |
| DE | 196 26 926 A1 | 1/1998 |
| DE | 10 2005 018 649 A1 | 10/2006 |
| DE | 10 2009 054 985 A1 | 1/2011 |
| DE | 10 2010 040 097 A1 | 3/2011 |
| DE | 10 2011 076 675 A1 | 12/2011 |
| DE | 10 2011 076 952 A1 | 12/2011 |
| WO | WO 2008/025797 A1 | 3/2008 |

OTHER PUBLICATIONS

German Search Report—Oct. 30, 2012.
International Search Report—Aug. 31, 2012.

* cited by examiner

*Primary Examiner* — John R Olszewski
*Assistant Examiner* — Jeffrey Boomer
(74) *Attorney, Agent, or Firm* — Brinks Gilson & Lione

(57) ABSTRACT

A system and device and a method for controlling an electrohydraulic brake system of a motor vehicle especially adapted for brake by wire applications. The embodiments carryout position control of an actuator of an electronically activatable pressure supply unit based on the actuator position actual value and on and actuator position reference value which is determined on the basis of a pressure reference value.

14 Claims, 2 Drawing Sheets

METHOD AND DEVICE FOR CONTROLLING AN ELECTROHYDRAULIC BRAKE SYSTEM

CROSS-REFERENCE TO RELATED APPLICATIONS

This application claims priority to German Patent Application Nos. 10 2011 003 230.4, filed Jan. 27, 2011, 10 2012 200 705.9, filed Jan. 19, 2012, and PCT/EP2012/050824, filed Jan. 20, 2012.

FIELD OF THE INVENTION

The invention relates to a method and device for controlling an electrohydraulic brake system.

BACKGROUND

Brake-by-wire brake systems are being used increasingly widely in motor vehicle technology. Such brake systems often include, in addition to the brake master cylinder actuatable by the vehicle driver, an electrically controllable pressure supply unit by means of which, in the brake-by-wire operating mode, actuation of the wheel brakes takes place either directly or via the brake master cylinder. In order to communicate an agreeable pedal feel to the vehicle driver in the brake-by-wire operating mode, the brake systems usually include a brake pedal feel simulation arrangement which is operatively connected to the brake master cylinder, for example. In order to activate the brake system, a set-point generator which, for example, evaluates the electrical signals from one or more sensors in order to determine the driver's braking request (actuation request), is provided in order to determine a reference value for activating the pressure supply unit. However, in these brake systems the pressure supply unit may be actuated on the basis of electronic signals without active intervention by the driver. These electronic signals may be outputted, for example, by an electronic stability program (ESC) or by a distance control system (Adaptive Cruise Control or ACC), so that the set-point generator determines a reference value for activating the pressure supply unit on the basis of these signals.

A brake system is known from the international patent application WO 2008/025797 A1, in which brake system it is proposed to hold in readiness, in an unpressurized state in the pressure supply unit, the pressure medium required for electrically controlling the pressure introduced into an intermediate chamber used to actuate the brake master cylinder, and to subject said pressure medium to increased pressure as required in order to be able to dispense with complex and energetically unfavorable buffering of hydraulic actuation energy. For this purpose the pressure supply unit is formed by a cylinder-piston arrangement, the piston of which can be actuated by an electromechanical actuator. The brake system includes a pressure sensor for detecting the actual pressure of the pressure supply unit. A control system of the brake system, in particular of the pressure supply unit, is not described.

The brake system described in DE 10 2010 040 097 A1 includes a brake master cylinder and a pressure supply unit formed by a cylinder-piston arrangement, the piston of which can be actuated by an electromechanical actuator. Each wheel brake is hydraulically connectable to the brake master cylinder and to the pressure supply unit. Here, too, pressure sensors for detecting the actual pressure of the pressure supply unit are provided. A method for controlling the pressure supply unit is not described in detail here also.

The unpublished document DE 10 2011 076 675.8 describes a method for controlling an electrohydraulic brake system for motor vehicles having an electronically activatable pressure supply unit which is connected to hydraulically actuatable wheel brakes. The pressure supply unit comprises a cylinder-piston arrangement with a hydraulic pressure chamber the piston of which is displaceable relative to a rest position by an electromechanical actuator. In order to control the pressure supply unit there is provided a control device with a pressure regulator which carries out the control on the basis of a pressure reference value and a pressure actual value of the pressure supply unit. For this purpose the pressure actual value must therefore be determined, for example by means of a pressure sensor as in the above-mentioned brake systems.

It is the object of the present invention to provide a method and a device for controlling an electrohydraulic brake system having an electronically activatable pressure supply unit which make it possible to set a predetermined pressure reference value in the pressure supply unit without the necessity to determine a pressure actual value of the pressure supply unit. In particular, the brake system is to be able to operate without a pressure sensor for measuring the pressure of the pressure supply unit.

This object is achieved according to the invention by a method, a device and by a corresponding brake system as described herein.

The invention is based on the concept of carrying out a position control of the actuator, which control is based on the actuator position actual value and on an actuator position reference value which is determined on the basis of the predetermined pressure reference value.

According to a preferred embodiment of the method according to the invention, an actuator torque actual value of the electromechanical actuator is determined and used for the control.

For simple and rapid determination of the actuator position reference value, the actuator position reference value is preferably determined from the predetermined pressure reference value on the basis of a predetermined pressure/travel characteristic.

In order to take account of the actual situation, the actuator torque actual value is preferably taken into account additionally when determining the actuator position reference value. In this way a second independent input variable, so to speak, is taken into account.

According to a preferred development of the method according to the invention, a correction of a (first) actuator position reference value calculated from the pressure reference value is carried out on the basis of the actuator torque actual value. Here, the (first) actuator position reference value is especially preferably calculated solely from the pressure reference value. Adaptation to the actual situation is effected by means of the correction.

First, an actuator torque reference value is preferably determined from the pressure reference value and is then used for the correction of the (first) actuator position reference value.

A correction actuator position value is preferably determined on the basis of the pressure reference value, the actuator torque actual value and an actuator acceleration torque. This correction actuator position value is then especially preferably added to the actuator position reference value calculated from the pressure reference value. This resulting actuator position value is advantageously used as the actuator position reference value in the position control.

It is preferred that the correction actuator position value is formed by integrating a difference which is yielded through subtraction by the actuator torque reference value calculated from the pressure reference value, and the difference from the actuator torque actual value and an actuator acceleration torque.

The method according to the invention is advantageously carried out in a brake system for motor vehicles which can be activated in a so-called brake-by-wire operating mode both by the vehicle driver and also independently of the vehicle driver, is preferably operated in the brake-by-wire operating mode and can be operated in at least one fall-back operating mode in which only operation by the vehicle driver is possible.

An advantage of the invention is that, in order to set the predetermined pressure reference value in the pressure supply unit, it is not necessary to determine a pressure actual value of the pressure supply unit. The control is based only on the signals of the electromechanical actuator, for example the actuator torque and the actuator position, and variables derivable therefrom, which are usually available in any case as a result of activation. The necessary equivalent parameter for the actual pressure information is determined solely on the basis of the actuator signals. A pressure sensor for measuring the pressure of the pressure supply unit can thereby be dispensed with in the brake system, reducing the production costs.

The wheel brake or brakes is/are preferably connected hydraulically to the pressure chamber of the pressure supply unit. In this way pressure medium volume expelled from the pressure chamber is displaced directly into the wheel brake(s), whereby throttling effects through friction or the like are avoided. An electrically activatable inlet valve with which the wheel brake can be isolated hydraulically from the pressure chamber is preferably arranged between one, in particular each, wheel brake and the pressure chamber.

Alternatively, it is preferred that the wheel brake(s) is/are hydraulically connected disconnectably to a hydraulic (outlet) pressure chamber of a brake master cylinder or of a floating piston arrangement, the brake master cylinder piston or the inlet pressure side of the floating piston arrangement being actuatable by the pressure of the pressure chamber of the pressure supply unit. The wheel brake(s) is/are then no longer directly connected hydraulically to the pressure chamber of the pressure supply unit, but is/are actuatable by means of the pressure supply unit.

The, especially each, wheel brake is preferably connectable to a brake fluid reservoir, for example via an electrically activatable outlet valve.

It is also preferred that the hydraulic pressure chamber of the cylinder piston arrangement is connectable to the brake fluid reservoir via at least one electrically activatable valve.

The control device preferably includes a first functional module in which a first actuator position reference value is determined from the pressure reference value ($P_{V,soll}$) and in which a correction of the first actuator position reference value is carried out on the basis of the actuator torque actual value, in order to take account of operationally induced deviations of the actual interrelationship between pressure and actuator position (pressure/volume interrelationship) from the interrelationship assumed or taken as a basis in the determination. The first actuator position reference value is especially preferably determined from the pressure reference value on the basis of a predetermined pressure-travel characteristic.

The switching states of the valves associated with the wheel brakes, and/or information on whether a pressure control function is active and optionally which pressure control function is active, are preferably supplied additionally to the first functional module. The switching states and/or the information are especially preferably used for determining the first actuator position reference value.

According to a development of the device according to the invention, the control device includes a second functional module in which a correction actuator position value is determined on the basis of the pressure reference value, the actuator torque actual value and an actuator acceleration torque. With the correction actuator position value a motor-signal based correction of the first actuator position reference value is possible.

The invention also relates to a brake system in which a method according to the invention is carried out or which includes a device according to the invention.

BRIEF DESCRIPTION OF THE DRAWINGS

Further preferred embodiments of the invention are apparent from the dependent claims and from the following description with reference to figures, in which:

DETAILED DESCRIPTION

Figure 1:
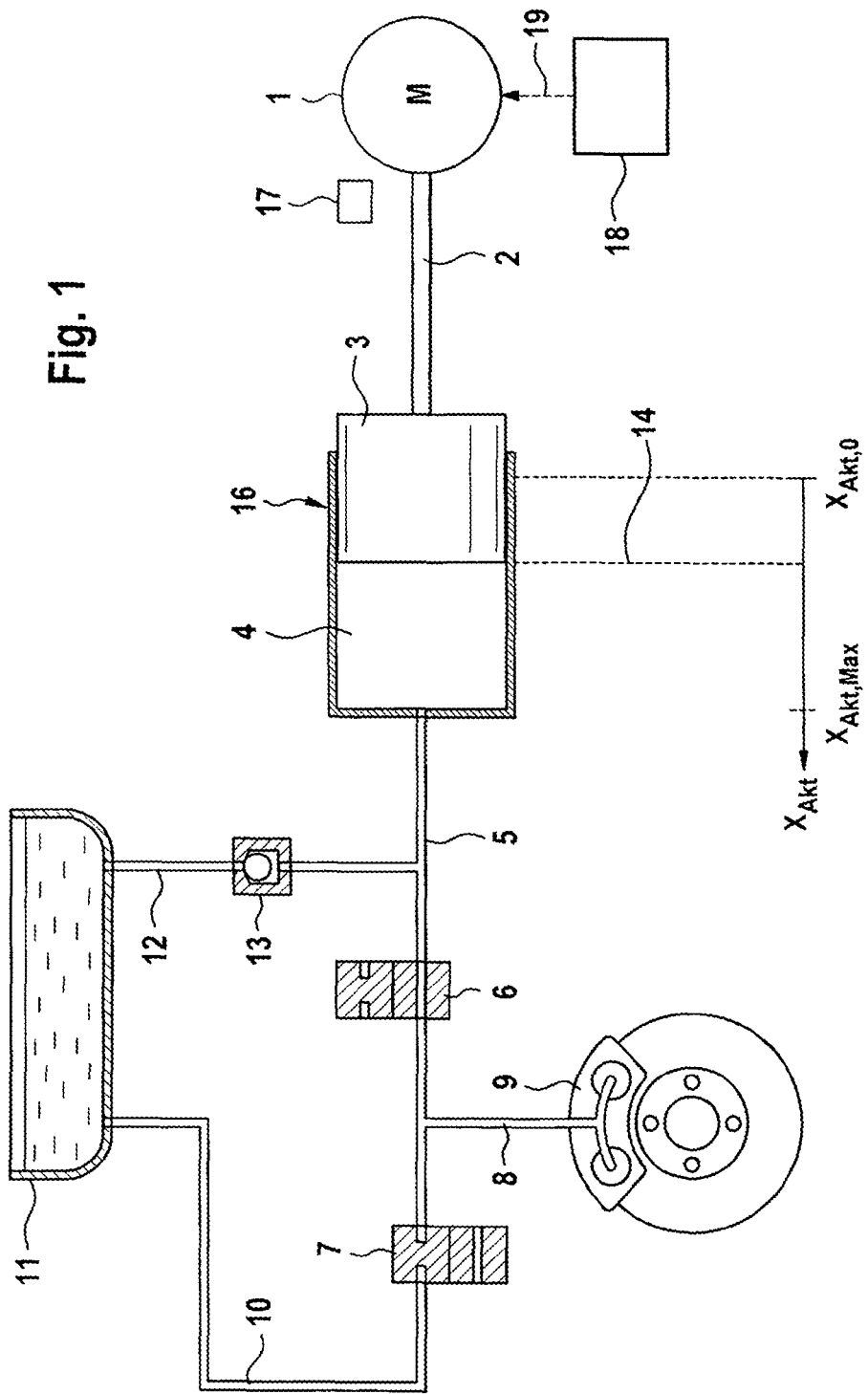
FIG. 1 shows schematically a basic circuit diagram of an exemplary brake system for carrying out a method according to the invention.

In FIG. 1 a basic circuit diagram of an exemplary brake system for motor vehicles for carrying out a method according to the invention is represented schematically. The brake system comprises a brake pedal (not shown) and an electronically activatable pressure supply unit 16 by means of which a pressure can be generated for actuating at least one hydraulically actuatable wheel brake 9. The actuation of the brake pedal, or the driver's braking request, is detected and the electronically activatable pressure supply unit 16 is electronically activated correspondingly. In the example, the electronically activatable pressure supply unit 16 is formed by a cylinder-piston arrangement with a hydraulic pressure chamber 4 and a plunger piston 3. The plunger piston 3 is displaceable by means of an electromechanical actuator, for example an electric motor 1 with a suitable transmission 2, so that a pressure can be set in the hydraulic pressure chamber 4. The transmission 2 is in the form, for example, of a rotation-translation gear. The wheel brake 9 is preferably connectable or connected hydraulically via lines 8 and 5 to the pressure chamber 4 of the pressure supply unit 16. Alternatively, it is possible that the wheel brake(s) are hydraulically connectable or connected via a line to an (outlet) pressure chamber of a brake master cylinder or of a dividing piston arrangement, a piston of the brake master cylinder or of the dividing piston arrangement being actuatable by the pressure supply unit via an (inlet) pressure chamber/intermediate chamber (not shown, cf. e.g. WO 2008/025797 A1 or DE 10 2009 054 985.4). In all cases a pressure request $P_{V,Soll}$ (for example by the driver or by a brake control function) is converted electronically with the aid of the electronically activatable pressure supply unit 16 into a pressure to be applied to the wheel brake(s) 9.

The exemplary brake system of FIG. 1 further comprises, in order to modulate the brake pressure at the wheel brakes 9, an inlet valve 6 arranged in the line 5 and an outlet valve 7, which outlet valve 7 can connect the wheel brake 9 to a pressure medium reservoir 11 as required. The pressure chamber 4 of the pressure supply unit 16 is connected to the pressure medium reservoir 11 via a connecting line 12 with a non-return valve 13, which closes in the direction of the pressure medium reservoir 11, in order to draw pressure medium from the pressure medium reservoir 11 into the pressure chamber 4.

The brake pedal advantageously cooperates with a brake pedal feel simulation arrangement which communicates an agreeable pedal feel to the driver. When actuating the brake pedal to request a braking pressure in the brake-by-wire operating mode, the driver is not connected directly to the wheel brake 9, but actuates a brake pedal feel simulation arrangement which has a suitable pedal characteristic, so that the driver is enabled to apply a sufficiently precise force related to the required braking request.

As the piston 3 of the pressure supply unit 16 is displaced by means of the electric motor 1 by a travel distance $X_{Akt}$ from its rest position $X_{Akt,0}$ to a position 14 during braking, a certain volume of brake fluid is displaced from the pressure chamber 4 via the line 5 and an initially open inlet valve 6 into the wheel brake line 8 and therefore into the wheel brake 9. A braking pressure is thereby generated in the wheel brake 9.

A brake pressure reduction can be effected by moving the piston 3 back in the direction of the rest position $X_{Akt,0}$. However, a rapid brake pressure reduction, as is necessary in the case of anti-lock control (ABS), is also possible via the valve combination 6 and 7, by closing the inlet valve 6 and opening the outlet valve 7 for a certain time. Brake fluid then flows out of the wheel brake 9 via the line 8 through the outlet valve 7 and the line 10 into the pressure medium reservoir 11. This pressure-reducing measure is especially useful if the pressure chamber 4 is connected to a plurality of wheel brakes, the brake pressures of which are to be controlled in a wheel-individual way.

In principle, the brake system represented in FIG. 1 can be extended by any desired number of wheel brakes 9 in that additional lines 5 are laid to wheel brake lines 8, each wheel brake 9 preferably having an individual valve pair comprising inlet valve 6 and outlet valve 7. In order to provide a multi-circuit configuration of the brake system for safety reasons, the pressure supply unit may also include two or more pistons 3 and two or more associated pressure chambers 4. For a passenger car a dual circuit system is appropriate, two wheel brakes 9 being connected in each case to one of two pressure chambers 4. The pressure supply unit can then be configured as a piston-cylinder arrangement with two pistons (one piston is actuated directly by the actuator) and two pressure chambers, or by two piston-cylinder arrangements, each comprising one piston and one pressure chamber. Alternative embodiments for configuring the pressure control valves are also possible.

Further exemplary brake systems for implementing a method according to the invention are described in WO 2008/025797 A1 and in the unpublished DE 10 2009 054 985.

In the example, there is provided a measuring device 17 by means of which a position or setting of the actuator 1, for example the motor angular position of the rotor position angle of the electric motor 1, is detected. The actuator electric motor 1 is preferably an electronically commutated motor. It is assumed hereinafter by way of example that field-oriented control is used. In conjunction with this field-oriented control the motor torque $M_{Akt}$ is determined, for example from the motor current or motor currents, and the actual motor angular position $\phi_{Mot}$ is determined, for example by means of a sensor.

On the basis of the motor angular position $\phi_{Mot}$ the actual position/actual travel $X_{Akt}$ of the plunger piston 3 is ascertained by means of the equation $$X_{Akt} = v*(\phi_{Mot} - \phi_{Mot,0}),$$

where the factor v represents the ratio of the transmission 2, which is predetermined, and the value $\phi_{Mot,0}$ represents the angular offset value which corresponds to the rest position $X_{Akt,0}$ of the actuator and which is known or can be determined. To simplify the presentation of formulae, this value is usually assumed as $X_{Akt,0}=0$. By simple or double time-differentiation of the motor angular position $\phi_{Mot}$, or of the actuator position/travel $X_{Akt}$, the velocity $\omega_{Akt}$ or the acceleration of the actuator is obtained.

In addition, the brake system in the example includes an electronic control and regulation unit 18 to which a pressure reference value $P_{V,Soll}$ for the pressure supply unit 16 and the actuator variables position $X_{Akt}$ (or motor angular position $\phi_{Mot}$) and torque $M_{Akt}$ are supplied and in which a manipulated variable ($\omega_{Akt,Soll}$, $M_{Akt,Soll}$) for activation 19 of the pressure supply unit 16 and of the actuator 1 is formed.

The necessity to set a predetermined pressure $P_{V,Soll}$ or pressure curve $P_{V,Soll}(t)$ in the pressure supply unit 16 by means of a control method always arises when the driver, by actuating the brake pedal, requests a general brake pressure for all the wheels of the motor vehicle or when this pressure request is made by a driver assistance function (for example, adaptive cruise control (ACC), hill start assist (HSA), hill descent control (HDC) etc.), or when a particular wheel-individual brake pressure control function, for example of an anti-lock system (ABS), a traction control system (TCS) or electronic stability program (ESP, ESC) becomes active. A driver assistance function usually requests a "global" brake pressure for all wheel brakes 9, similarly to the driver's basic braking request triggered by means of the brake pedal. In these cases the pressure is generated equally in all the brake lines 8 by displacement of the piston 3 with the inlet valves 6 open. In general, the anti-lock function (ABS) limits or reduces only the pressure exerted in the pressure chamber 4 for individual wheel brakes 9 in order to maintain said wheel brakes 9 in a desired optimum brake slip condition. In the case of traction control (TCS) individual wheel brakes 9 which are tending to spin as a result of excessive drive torque are braked in a specified manner. For this purpose a pressure which has not been requested by the driver is generated actively in the brake system, by displacement of the piston 3 in the pressure chamber 4. The pressure from the pressure chamber 4 is then directed in a wheel-individual manner via the valves 6, 7 into the wheel brake 9 of the wheel to be braked while the wheel brakes 9 of the other wheels, which remain uncontrolled, are isolated from the pressure chamber 4 by means of their inlet valves 6. The case is similar for the electronic stability program (ESP, ESC). Here, braking pressures are likewise exerted actively and wheel-selectively on individual wheel brakes 9 in order to influence the dynamics of the vehicle about the vertical axis. In all cases, the pressure in the pressure chamber 4 is advantageously to be set such that the wheel brake with the highest braking pressure request can be supplied reliably with the necessary pressure. In a wheel brake which requires less pressure than is generated in the pressure chamber 4, the pressure is limited by continuously or intermittently closing the inlet valve 6 associated with the wheel brake. If a wheel should then require a pressure lower than that already set, and if the pressure of the pressure supply unit 16 is higher than the desired wheel brake pressure, pressure medium is discharged from the wheel brake 9 into the reservoir 11 by means of the associated outlet valve 7.

Figure 2:
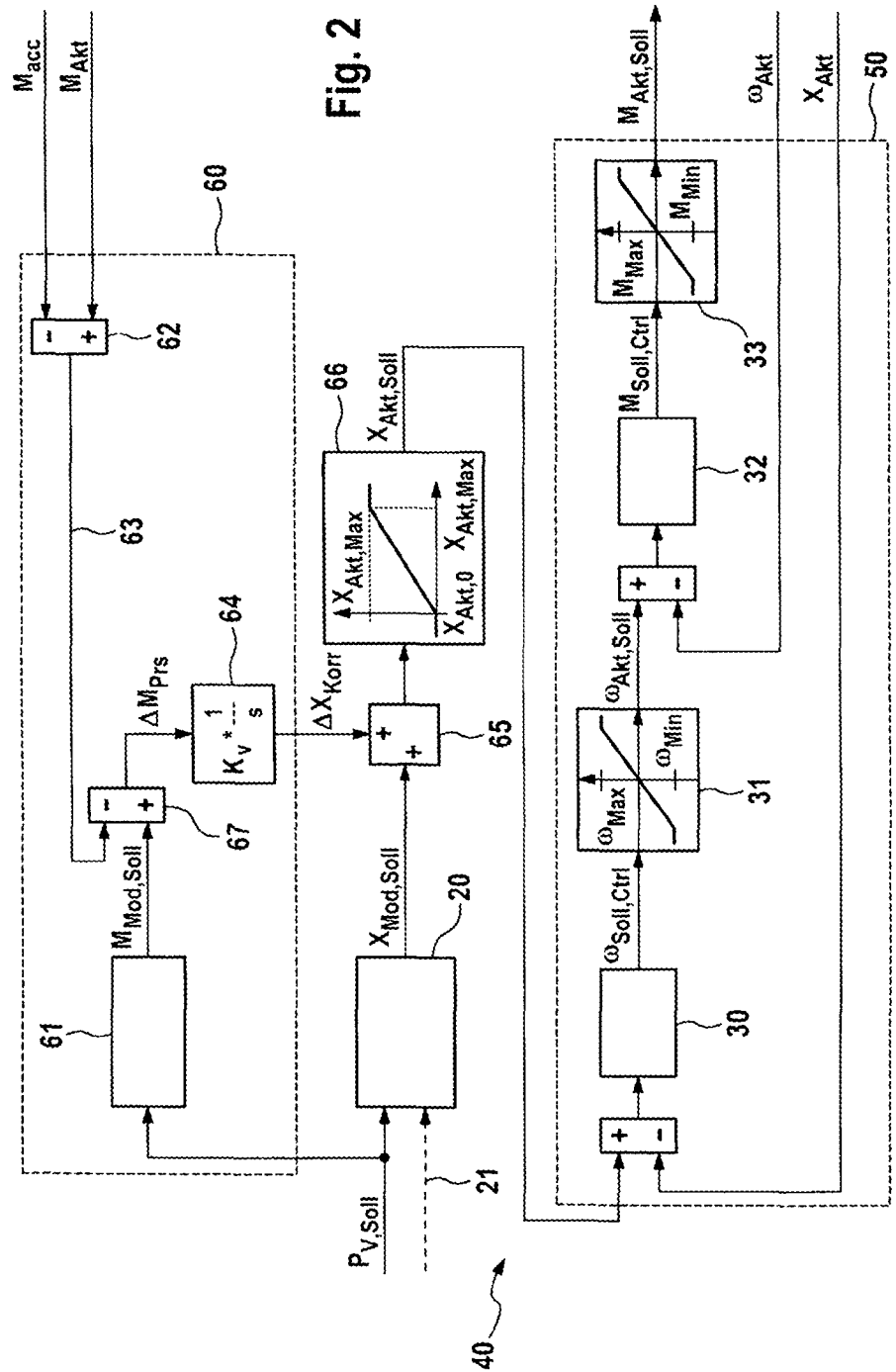
FIG. 2 shows schematically an exemplary control device for carrying out a method according to the invention.

An exemplary control device for carrying out a method according to the invention is represented schematically in FIG. 2. The control device 40 serves to set a desired reference pressure or reference pressure curve $P_{V,Soll}$ of the pressure supply unit 16 by appropriate activation of the actuator 1. The value for the reference pressure $P_{V,Soll}$ is predetermined by a set-point generator and is produced, for example, on the basis of the above-described requests. The control device 40 comprises essentially two functional groups: a functional module "pressure/volume characteristic" 20 and a functional module "actuator position control" 50. Advantageously, the control device 40 also includes in the example a functional module "motor-signal based characteristic correction" 60. The functional modules 20, 50 and 60 are explained in more detail below. The corresponding control method is based, apart from the predetermined reference pressure $P_{V,Soll}$, exclusively on actuator signals, namely the actuator position $X_{Akt}$ and advantageously also the actuator torque $M_{Akt}$. A measured actual pressure of the pressure supply unit 16 is not utilized.

In the functional model "pressure/volume characteristic" 20 a conversion of the reference pressure $P_{V,Soll}$ into a corresponding actuator reference position $X_{Mod,Soll}$ takes place by means of a model for the brake pressure/volume take-up characteristic (which characterizes the brake system under consideration). This brake pressure/volume take-up characteristic is predetermined and is stored, for example, in the control and regulation unit 18 in the form of a functional interrelationship or a characteristic curve (pressure-travel interrelationship or pressure-position interrelationship).

In order to take account of—for example operationally induced—deviations of the actual braking characteristic, that is, of the actual pressure/volume interrelationship, from the predetermined brake pressure/volume take-up characteristic when determining an actuator reference position, the functional module "motor-signal based characteristic correction" 60 is provided in the example. The output signal of the functional module "motor-signal based characteristic correction" 60 is a correction travel distance $\Delta X_{Korr}$, on which the actuator reference position $X_{Mod,Soll}$ of the functional module "pressure/volume characteristic" 20 is additively superposed in block 65. In block 66 a limitation to the maximum possible actuator position $X_{Akt,max}$ optionally takes place, the output signal of block 66, the actuator reference position $X_{Akt,Soll}$, constituting an input signal for the following functional module "actuator position control" 50.

For example, wheel-individual pressure control functions (such as anti-lock control (ABS) or stability control (ESC)), which are carried out using valve combinations 6 and 7 associated with the corresponding wheel brake 9, lead to a change in the interrelationship between the travel of the piston (actuator travel $X_{Akt}$) and the pressure $P_V$ being established in the pressure supply unit 16, and can be compensated by the characteristic correction 60.

In order to keep the correction effort by the functional module "motor-signal based characteristic correction" 60 as small as possible, according to an especially advantageous exemplary embodiment of the invention the switching states of the valve combinations 6, 7 associated with the wheel brakes 9 are also supplied to the functional module "pressure/volume characteristic" 20, in addition to the reference pressure signal $P_{V,Soll}$. This additional (optional) information is indicated in FIG. 2 by the broken line arrow 21. On the basis of the switching information it can be ascertained how many wheel brakes are connected to the pressure supply unit 16. By taking account of the respective pressure-volume characteristics associated with the wheel brakes, it can now be ascertained which volume or volume change, for the predetermined reference pressure or reference pressure change, must be displaced into the wheel brakes connected to the pressure supply unit 16. A more accurate control of the pressure $P_V$ by the position instruction $X_{Mod,Soll}$ of the functional module "pressure/volume characteristic" 20 is thereby achieved, and a reduced correction effort by the functional module "motor-signal based characteristic correction" 60 is attained.

In the exemplary functional module "motor-signal based characteristic correction" 60 use is made of the fact that, for the arrangement considered here—in which a pressure can be set in a hydraulic pressure chamber 4 by means of an electromechanical actuator 1, for example an electric motor with a suitable transmission—a proportional interrelationship exists between the pressure $P_V$ set in the pressure chamber 4 and the motor torque $M_{Akt}$, since the pressure $P_V$ leads to a loading of the actuator 1 by a torque $M_{Prs,Last}$ which the motor must compensate by exerting a corresponding counter-torque. In block 61 a corresponding motor reference torque $M_{Mod,Soll}$ is determined, while assuming the proportional interrelationship, from the reference pressure $P_{V,Soll}$ supplied to the functional module 60, account being taken, for example, of the ratio ν of the transmission 2, the area of the piston 3 and the efficiency-determined increase (requested pressure build-up) or decrease (requested pressure reduction) of the motor torque. Furthermore, in block 62 of the functional module 60 the difference is formed from the motor torque $M_{Akt}$—ascertained, for example, via the motor current—which is supplied to the functional module 60, and an acceleration torque $M_{acc}$, which represents the acceleration of the actuator and is determined, for example, from a predetermined moment of inertia of the actuator and the actuator acceleration determined from the actuator position $X_{Akt}$ by double time-differentiation, and the resulting torque signal 63 is subtracted in block 67 from the motor reference torque $M_{Mod,Soll}$ of block 61. From the resulting difference torque $\Delta M_{Prs}$ the correction travel $\Delta X_{Korr}$ is integrated in module 64—which correction travel $\Delta X_{Korr}$ is used, as described above, to correct the actuator reference position $X_{Mod,Soll}$ of the functional module 20 (block 65).

The basic principle of the exemplary "motor-signal based characteristic correction" 60 operates in a manner such that, as long as the torque signal 63 ($M_{Akt} - M_{Acc}$) formed from $M_{Akt}$ and $M_{Acc}$ does not correspond to the requested reference torque signal $M_{Mod,Soll}$, the correction travel $\Delta X_{Korr}$ is integrated as a function of the difference thereof, $\Delta M_{Prs}$. If the torque difference $\Delta M_{Prs}$ equals zero the correction travel $\Delta X_{Korr}$ is no longer changed. In this case the difference $M_{Akt} - M_{Acc}$ corresponds to the requested signal $M_{Mod,Soll}$, which in turn means that the requested reference value $P_{V,Soll}$ for the pressure $P_V$ of the pressure supply unit 16 has been set by the actuator 1.

The functional module "actuator position control" 50 includes in the example a position controller 30 with a subordinate (motor) speed controller 32. The reference position $X_{Akt,Soll}$ of the actuator and the current actual position $X_{Akt}$ of the actuator are supplied to the position controller 30. The position controller 30 adjusts the deviation between the requested reference position $X_{Akt,Soll}$ and the actual position $X_{Akt}$ by specifying a reference (motor) speed $\omega_{Soll,Ctrl}$, which is supplied to a limitation function 31 for limitation to the minimum or maximum admissible reference speed $\omega_{Min}$ or $\omega_{Max}$. The output value of the position controller 30 including the limitation function 31 is the reference value for the motor speed $\omega_{Akt,Soll}$ of the actuator 1 which is transmitted to the speed controller 32 as an input variable. A further input variable of the speed controller 32 is the actual motor speed or actual speed $\omega_{Akt}$ of the actuator. The actual value of the motor speed $\omega_{Akt}$ is determined, for example, from the actuator position $X_{Akt}$, as described above. The output value of the speed controller 32, after a torque limitation 33 to limit to the minimum or maximum admissible motor torque $M_{Min}$ or $M_{Max}$, is the motor torque $M_{Akt,Soll}$.

An alternative implementation of the functional module "actuator position control" 50 is also possible in principle.

The above description constitutes the preferred embodiment of the present invention, it will be appreciated that the present invention is susceptible to modification, variation and change without departing from the proper scope and fair meaning of the accompanying claims.

The invention claimed is:

1. A method for controlling an electrohydraulic brake system for motor vehicles, comprising at least one hydraulically actuatable wheel brake (9) which can be actuated by means of an electronically activatable pressure supply unit (16) which includes a cylinder-piston arrangement having a hydraulic pressure chamber (4), and a piston (3) which is displaceable by an electromechanical actuator (1), so that a predeterminable pressure reference value ($P_{V,Soll}$) is configured to be set in the hydraulic pressure chamber (4), an actuator position actual value ($X_{Akt}$) of a position of the pressure supply unit (16) being ascertained, a manipulated variable ($\omega_{Akt,Soll}$, $M_{Akt,Soll}$) for activating the actuator (1) generated by means of a control device(40), a position control (50) of the actuator (1) being carried out in the control device (40) on the basis of the actuator position actual value ($X_{Akt}$) and of an actuator position reference value ($X_{Mod,Soll}$) and the actuator position reference value ($X_{Mod,Soll}$) being determined on the basis of the predetermined pressure reference value ($P_{V,Soll}$).

2. The method as claimed in claim 1, further comprising in that the actuator position reference value ($X_{Mod,Soll}$) is determined from the pressure reference value ($P_{V,Soll}$) on the basis of a predetermined interrelationship between pressure in the pressure chamber and position (20) of the piston or of the actuator.

3. The method as claimed in claim 1 further comprising in that an actuator torque actual value ($M_{Akt}$) of the electromechanical actuator (1) is ascertained and that the actuator torque actual value ($M_{Akt}$) is used in determining the actuator position reference value ($X_{Mod,Soll}$).

4. The method as claimed in claim 3, further comprising in that a correction ($\Delta X_{Korr}$) of the actuator position reference value ($X_{Mod,Soll}$) is calculated exclusively from the pressure reference value ($P_{V,Soll}$) on the basis of the actuator torque actual value ($M_{Akt}$).

5. The method as claimed in claim 4, further comprising in that an actuator torque reference value ($M_{Mod,Soll}$), which is utilized for the correction ($\Delta X_{Korr}$) of the position reference value ($X_{Mod,Soll}$), is determined (67) from the pressure reference value ($P_{V,Soll}$).

6. The method as claimed in claim 4 further comprising in that the correction of the actuator position reference value ($\Delta X_{Korr}$) is determined on the basis of the pressure reference value ($P_{V,Soll}$) of the actuator torque actual value ($M_{Akt}$) and of an actuator acceleration torque ($M_{acc}$).

7. The method as claimed in claim 6, further comprising in that the correction of the actuator position reference value ($\Delta X_{Korr}$) is added to the actuator position reference value ($X_{Mod,Soll}$) calculated from the pressure reference value ($P_{V,Soll}$), and in that a resulting actuator position value is supplied to the position control (50) as the actuator position reference value ($X_{Mod,Soll}$).

8. The method as claimed in claim 6 further comprising in that a difference from the actuator torque actual value ($M_{Akt}$) and the actuator acceleration torque ($M_{acc}$) is subtracted from an actuator torque reference value ($M_{Mod,Soll}$) calculated from the pressure reference value ($P_{V,Soll}$) and in that this difference ($\Delta M_{Prs}$) is integrated to form the correction of the actuator position reference value ($\Delta X_{korr}$).

9. A device for controlling an electrohydraulic brake system, comprising an electronically activatable pressure supply unit (16) having a pressure chamber (4) of which a predeterminable pressure reference value (PV,Soll) is configured to be set, comprising a means (17) for ascertaining an actuator position actual value ($X_{Akt}$) of a position of the pressure supply unit (16), a means for ascertaining an actuator torque actual value ($M_{Akt}$) of the electromechanical actuator (1), and a control device (40) which generates a manipulated variable ($\omega_{Akt,Soll}$, $M_{Akt,Soll}$) for activating the actuator (1), the control device (40) includes a position control device (50, 30) to which the actuator position actual value ($X_{Akt}$) and an actuator position reference value ($X_{Mod,Soll}$) determined, on the basis of the predetermined pressure reference value ($P_{V,Soll}$) are supplied as input variables.

10. The device as claimed in claim 9, further comprising in that the position control device (50, 30) includes a position controller (30) with a subordinate speed controller (32).

11. The device as claimed in claim 9 further comprising in that the control device (40) includes a first functional module (20, 65) in which a first of the actuator position reference value ($X_{Mod,Soll}$) is determined from the pressure reference value ($P_{V,Soll}$) on the basis of a predetermined interrelationship between pressure in the pressure chamber and a position (20) of the actuator, and in which a correction (65) of the first actuator position reference value ($X_{Mod,Soll}$) carried out on the basis of the actuator torque actual value ($M_{Akt}$).

12. The device as claimed in claim 11 further comprising in that the control device (40) includes a second functional module (60) inwhich a correction actuator position value ($\Delta X_{korr}$) is determined on the basis of the pressure reference value ($P_{V,Soll}$), of the actuator torque actual value ($M_{Akt}$) and of an actuator acceleration torque ($M_{acc}$).

13. The method as claimed in claim wherein the method is carried out by providing a control device (40).

14. An electrohydraulic brake system for motor vehicles, comprising at least one hydraulically actuatable wheel brake (9) which can be actuated by means of the device in accordance with claim 9.

* * * * *